United States Patent [19]

Armer et al.

[11] Patent Number: 4,722,066
[45] Date of Patent: Jan. 26, 1988

[54] DIGITAL SIGNAL OVERFLOW CORRECTION APPARATUS

[75] Inventors: John Armer, Middlesex; Erwin J. Wittmann, North Plainfield, both of N.J.

[73] Assignee: RCA Corporation, Princeton, N.J.

[21] Appl. No.: 760,382

[22] Filed: Jul. 30, 1985

[51] Int. Cl.⁴ .............................................. G06F 11/00
[52] U.S. Cl. .................................... 364/745; 364/737
[58] Field of Search ....................... 364/745, 737, 724

[56] References Cited

U.S. PATENT DOCUMENTS

| | | | |
|---|---|---|---|
| 3,725,687 | 4/1973 | Heightley | 364/724 |
| 3,970,833 | 7/1976 | Gehweller | 364/745 |
| 4,215,415 | 7/1980 | Kanemasa | 364/745 |
| 4,282,581 | 8/1981 | Bondurant | 364/737 |
| 4,511,922 | 4/1985 | Lewis, Jr. | 358/166 |
| 4,592,008 | 5/1986 | Nopper | 364/745 |

FOREIGN PATENT DOCUMENTS 0048136 4/1979 Japan .
0142913 5/1985 United Kingdom .

OTHER PUBLICATIONS

Nguyen, "Practical Hardware Solutions for 2's Complement Arithmetic Problems", *Computer Design*, Jul. 1979, pp. 105-112.

Drumm, "Saturation Adder Solves Overflow Problems in 2nd-Order Filters", *Electronic Design*, vol. 28, No. 18, Sep. 1, 1980, pp. 167-168.

*Primary Examiner*—David M. Malzahn
*Attorney, Agent, or Firm*—Paul J. Rasmussen; Eric P. Herrmann; Dilip A. Kulkarni

[57] ABSTRACT

When a positive or a negative overflow error condition is encountered, the present invention substitutes the most positive or most negative value for the erroneous sample. The sign bit of a potentially erroneous value is inverted to form the MSB of the substitute value, and this value is, in turn, inverted and expanded to form the n−1 LSB's of the substitute value. If an overflow error condition is detected, the erroneous value is replaced by the substitute value.

9 Claims, 4 Drawing Figures

DIGITAL SIGNAL OVERFLOW CORRECTION APPARATUS

This invention relates to an apparatus for correcting the positive and negative overflows that occur in the processing of binary digital signals in a fixed-bit digital signal processing system—such as a digital television receiver.

BACKGROUND

In the television arts, considerable efforts have been directed toward digitizing the color video signal in the analog domain, processing the digitized samples of the analog video signal to separate the chrominance and luminance components and to demodulate the chrominance components into the respective baseband signals, and then converting the digital samples back into the respective analog signals for the application thereof to the television picture tube for reproduction. A motivation for these efforts comes from the fact that digital television can offer a number of novel features—such as still picture displays, multipicture displays, direct hookups to satellite dish amplifiers, etc. As the digital circuits become faster and less expensive, the concept of digital television becomes increasingly practical and attractive.

In a digital television receiver, the two's complement binary number system is in general use because it simplifies the circuitry required for performing arithmetic manipulations. To convert a pure binary number to its positive equivalent in two's complement, a zero is added to the next-higher-significant-bit position. When the negative of a positive two's complement binary number is required, the negative binary number is formed by complementing each bit position of the positive representation and then adding a one. The decimal numbers and the corresponding two's complement binary numbers are illustratively shown in TABLE 1. The most significant bit (MSB) of the two's complement binary numbers indicates the sign. If the MSB is a zero and a one, the two's complement binary number is positive and negative respectively.

TABLE 1

| DECIMAL NO. | TWO'S COMP. NO. |
|---|---|
| −128 | 1000 0000 |
| −127 | 1000 0001 |
| −126 | 1000 0010 |
| . | |
| . | |
| . | |
| −2 | 1111 1110 |
| −1 | 1111 1111 |
| 0 | 0000 0000 |
| +1 | 0000 0001 |
| +2 | 0000 0010 |
| . | |
| . | |
| . | |
| +126 | 0111 1110 |
| +127 | 0111 1111 |

An advantage of the two's complement number system is that the binary numbers are subtracted by adding the two's complement of the subtrahend to the minuend, and ignoring the carry bit. This eliminates the need for having separate circuitry for performing subtractions. For example, the subtraction (10)−(3) can be performed, instead, as an addition (10)+(−3). Thus,

```
  0000 1010 (+10)          0000 1010 (+10)
 −0000 0011 (+3)    →     +1111 1101 (−3)
  ─────────────            ─────────────
  0000 0111 (+7)           0000 0111 (+7)
```

In the processing of the binary signals, there are situations where unwarranted sign changes occur due to overflows. The word handling capacity of a fixed-bit binary digital processing system is limited. For example, an 8-bit digital processing system can only process whole numbers between −128 (1000 0000) and +127 (0111 1111) in the two's complement binary number system. The overflows occur when the number of bits in the resulting sum or product exceed the range of numbers which the system can handle (e.g., −128 to +127 in 8-bit two's complement system).

The signal overflows in a digital signal processing system can occur in both positive and negative directions. The positive overflows occur, for instance, when two positive, 8-bit numbers are added in the two's complement system to produce an erroneous 8-bit negative number. For example,

```
  0111 1111 (+127)          0111 1111 (+127)
 +0111 1111 (+127)   or    +0000 0001 (+1)
  ─────────────             ─────────────
  1111 1110 (−2)            1000 0000 (−128)
```

The negative overflows can, on the other hand, occur in the two's complement system, when two negative 8-bit numbers are added to generate an erroneous 8-bit positive number. For example,

```
  1000 0000 (−128)          1000 0000 (−128)
 +1000 0000 (−128)   or    +1111 1111 (−1)
  ─────────────             ─────────────
  0000 0000 (0)             0111 1111 (+127)
```

The overflow correction apparatus in accordance with this invention substitutes the most positive value (e.g., 0111 1111 or +127) and the most negative value (e.g., 1000 0000 or −128) for the erroneous samples when a positive and a negative overflow has occurred respectively. The overflow correction apparatus includes a circuit for generating appropriate substitute values comprising a pair of inverters connected together in series. The most significant bit (MSB) of a potentially erroneous sample is coupled to the input of the first inverter. The output of the first inverter forms the MSB of the substitute values, and is applied to the input of the second inverter. The output of the second inverter is expanded to define the least significant bits (LSB's) of the substitute values. When an overflow error condition is detected, the erroneous value of the processed sample is replaced by the appropriate substitute value.

Pursuant to a further feature of the invention, the second of the two inverters (which serves as a buffer) is eliminated, and the LSB's of the substitute values are generated directly by fanning out the MSB of the potentially erroneous samples.

IN THE DRAWINGS

DETAILED DESCRIPTION

Figure 1:
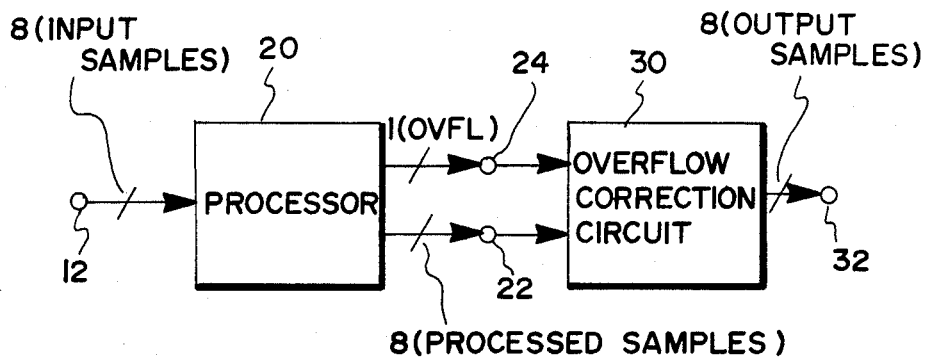
FIG. 1 is an overall block diagram of a digital signal processing system including an overflow correction apparatus in accordance with the subject invention.

In FIG. 1 digital signal processing system, indicated by a numeral 10, an input terminal 12 applies a sequence of 8-bit parallel binary digital samples in the two's complement system to a digital processor 20. The digital processor 20 performs signal processing operations including arithmetic operations—such as addition, subtraction, etc. The digital processor 20 has two outputs: (a) the processed 8-bit binary samples on a terminal 22, and (b) a 1-bit control signal on a terminal 24, indicative of the presence or absence of the overflow in the processed samples. It is noted that the processed input signal on the terminal 22 and the accompanying control signal on the terminal 24 are both synchronized by the system clock, and have the same data rate.

The processed input samples on the terminal 22 and the associated control signal on the terminal 24 are applied to an overflow correction circuit 30 in accordance with the subject invention. The subject overflow correction circuit 30 substitutes the most positive (0111 1111 or +127) and the most negative value (1000 0000 or −128) for the 8-bit processed input samples on the terminal 22 when a positive and a negative overflow condition is encountered respectively.

Figure 2:
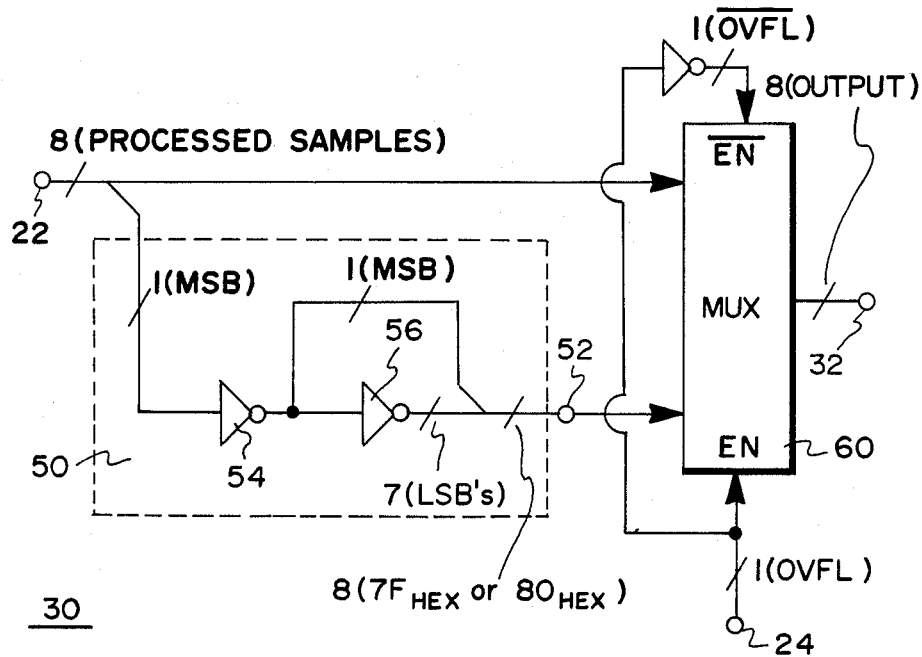
FIG. 2 depicts a block diagram of the subject overflow correction apparatus of FIG. 1.

As depicted in FIG. 2, the overflow correction apparatus 30 includes a means 50, responsive to the MSB of the potentially erroneous samples on the terminal 22, for generating the 8-bit substitute values on the output terminal 52 thereof. The substitute value generating means produces the most positive value 0111 1111 (i.e., +127 or $7F_{Hex}$) and the most negative value 1000 0000 (i.e., −128 or $80_{Hex}$) when the MSB of a potentially erroneous sample on the terminal 22 is a one and a zero respectively, thereby indicating a positive and a negative overflow.

The substitute value generating means 50 includes a pair of inverters 54 and 56 coupled together in series. The MSB of potentially erroneous, processed input samples is coupled to the input of the first inverter 54. The output of the first inverter 54 forms the MSB of the 8-bit substitute values, and is further applied to the input of the second inverter 56, which serves as a buffer. The output of the second inverter 56 is expanded to define the 7 LSB's of the 8-bit substitute values. The outputs of the two inverters 54 and 56 are combined to form the 8-bit substitute values (i.e., $7F_{Hex}$ and $80_{Hex}$).

For example, when the MSB of a potentially erroneous, processed input sample is a "one" indicating a positive overflow, the outputs of the first and second inverters 54 and 56 are respectively a "zero" and a "one", and the value on the output terminal 52 is 0111 1111 (i.e., +127). On the other hand, when the MSB of a potentially erroneous processed input sample is a "zero" indicating a negative overflow, the value on the terminal 52 is 1000 0000 (i.e., −128). See the examples of the positive and negative overflows in the BACKGROUND.

The overflow correction apparatus 30 additionally includes a two-input multiplexor 60 responsive to the overflow-indicative control signal on the terminal 24. One input of the multiplexor 60 has applied thereto the unaltered, potentially erroneous, processed input samples on the terminal 22. The second input of the multiplexor 60 has coupled thereto the associated substitute values ($7F_{Hex}$ and $80_{Hex}$) on the terminal 52. The multiplexor 60 passes on the unaltered values of the processed input samples to its output terminal 32 when there is no overflow. On the other hand, the multiplexor 60 couples the appropriate substitute values ($7F_{Hex}$ or $80_{Hex}$) associated with the processed input samples to the terminal 32 when an overflow has occurred in the processed input samples.

Figure 3:
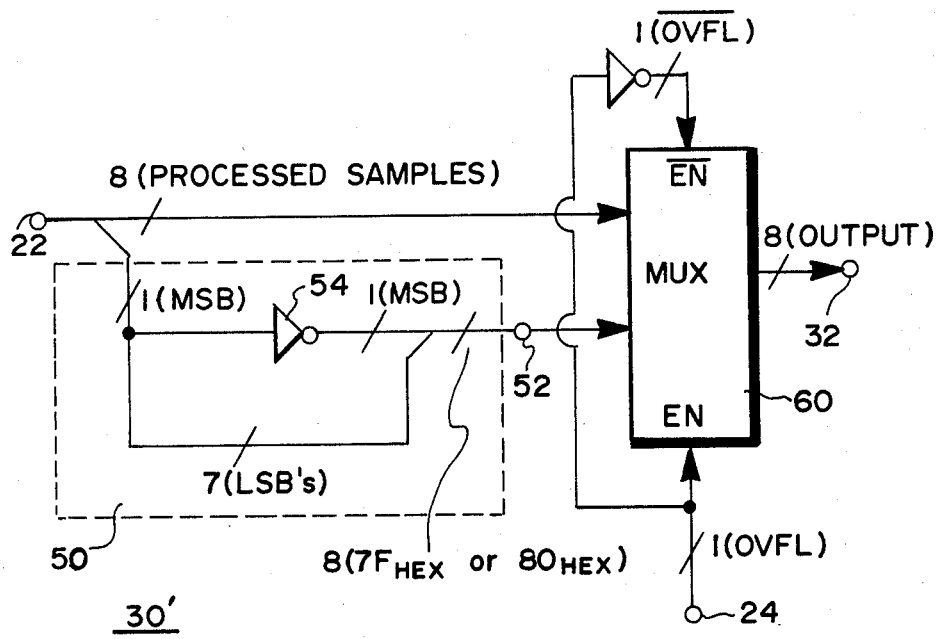
FIG. 3 illustrates a modification of the subject overflow correction apparatus of FIG. 2.

FIG. 3 represents a modification 30' of the subject overflow correction circuit 30. In the FIG. 3 modification, the second buffer inverter 56 is eliminated, and the 7 LSB's of the substitute values are generated directly by expanding the MSB of the potentially erroneous, processed input samples. The rest of the FIG. 3 circuitry is the same as the FIG. 2 circuitry.

Figure 4:
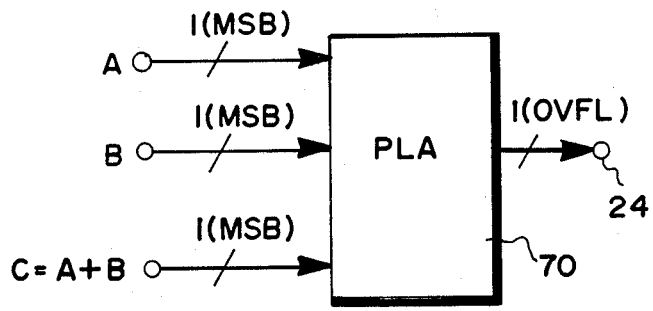
FIG. 4 shows a block diagram of an illustrative circuit, suitable for use in the FIG. 1 digital signal processing system, for generating an overflow-indicative control signal.

FIG. 4 shows an illustrative circuit 70 for generating the overflow-indicative control signal when an addition is performed. The control signal generating circuit 70, which is a part of the digital processor 20, may simply be a programmable logic array (PLA) fed with the signs of the two numbers A and B that are to added and the sign of the sum C. The PLA 70 can be programmed to generate the overflow-indicative control signal at its output terminal 24 as illustrated in TABLE 2.

TABLE 2

| A | B | C = A + B | OUTPUT |
|---|---|-----------|--------|
| + | + | −         | 1      |
| − | − | +         | 1      |
| + | − | +         | 0      |
| + | − | −         | 0      |
| − | + | +         | 0      |
| − | + | −         | 0      |

The overflow correction apparatus in accordance with this invention generates and substitutes appropriate limiting values $7F_{Hex}$ and $80_{Hex}$ for the potentially erroneous, processed input samples when there is a positive and a negative overflow respectively. The subject apparatus not only effectively performs its function, but is used relatively fewer components and is, therefore, less expensive.

What is claimed is:

1. Digital signal processing system for generating substitute values associated with n-bit potentially erroneous, processed input samples in the two's complement system: said system having means for providing a control signal indicative of the overflow in said n-bit processed samples; said system further including overflow correction apparatus comprising:

means responsive to the MSB of said potentially erroneous, processed input samples for generating the respective, n-bit substitute values; said substitute value generating means including a pair of inverters connected to each other in series: the respective outputs of the first and second inverters defining the MSB and the n−1 LSB's of said n-bit substitute values; and a two-input switch responsive to said control signal; one input of said two-input switch having coupled thereto said potentially erroneous, processed input samples; the second input of said switch being provided with said associated substitute values: said switch passing to the output thereof either said processed input samples or said associated substitute values depending upon the absence of or the presence of an overflow in said processed input samples.

2. The apparatus as defined in claim 1 wherein said two-input switch is a multiplexor.

3. The apparatus as defined in claim 1 wherein "n" is equal to eight.

4. The apparatus as defined in claim 3 wherein said substitute value generating means produces, at the output thereof, values equal to "$7F_{(H)}$" and "$80_{(H)}$", when the MSB of said processed input samples is a logical "one" and a logical "zero" respectively.

5. Digital signal processing apparatus comprising:
a source of potentially erroneous, n-bit processed input samples in the two's complement system;
a source of a control signal synchronous to and having the same data rate as said processed input samples, and indicative of the presence or the absence of an overflow in said processed input samples;
means responsive to the MSB of said potentially erroneous processed input samples for generating n-bit substitute values associated therewith; said substitute value generating means including a pair of inverters connected to each other in series; the respective outputs of the first and the second inverter defining the MSB and the n−1 LSB's of said n-bit substitute values; and
a two-input switch responsive to said control signal; one input of said two-input switch having coupled thereto said processed input samples; the second input of said switch being provided with said associated substitute values; said switch producing at the output thereof either said processed input samples or said associated substitute values depending upon the absence of or the presence of the overflow.

6. Digital signal processing apparatus for generating substitute values associated with n-bit potentially erroneous, processed input samples in the two's complement system comprising:
a pair of inverters connected together in series; the MSB of said potentially erroneous, processed samples being applied to the input of the first inverter; the output of said first inverter forming the MSB of said substitute values, and being coupled to the input of the second inverter; the output of second inverter defining the n−1 LBS's of said substitute values; and
means for concatenating said outputs of said first and second inverters to form said n-bit substitute values.

7. Digital signal processing system for generating substitute values associated with n-bit potentially erroneous, processed input samples in the two's complement system; said system having means for providing a control signal indicative of the overflow in said n-bit processed samples; said system further including overflow correction apparatus comprising:

means responsive to the MSB of said potentially erroneous, processed input samples for generating the respective, n-bit substitute values; said substitute value generating means including an inverter having its input coupled to the MSB of said processed input samples; the output of said inverter defining the MSB of said n-bit substitute values; the MSB of said processed input samples forming the n−1 LSB's of said n-bit substitute values; and
a two-input switch responsive to said control signal; one input of said two-input switch having coupled thereto said potentially erroneous, processed input samples; the second input of said switch being provided with said associated substitute values; said switch passing to the output thereof either said processed input samples of said associated substitute values depending upon the absence of or the presence of an overflow in said processed input samples.

8. Digital signal processing apparatus comprising:
a source of potentially erroneous, n-bit processed input samples in the two's complement system;
a source of a control signal synchronous to and having the same data rate as said processed input samples, and indicative of the presence or the absence of an overflow in said processed input samples;
means responsive to the MSB of said potentially erroneous processed input samples for generating n-bit substitute values associated therewith; said substitute value generating means including an inverter having its input coupled to the MSB of said processed input samples; the output of said inverter defining the MSB of said n-bit substitute values; the MSB of said processed input samples forming the n−1 LSB's of said n-bit substitute values; and
a two-input switch responsive to said control signal; one input of said two-input switch having coupled thereto said processed input samples; the second input of said switch being provided with said associated substitute values; said switch producing at the output thereof either said processed input samples or said associated substitute values depending upon the absence of or the presence of the overflow.

9. Digital signal processing apparatus for generating substitute values associated with n-bit potentially erroneous, processed input samples in the two's complement system comprising:
an inverter having its input coupled to the MSB of said processed input samples; the output of said inverter defining the MSB of said n-bit substitute values;
means for expanding the MSB of said processed input samples to form the n−1 LSB's of said n-bit substitute values at the output thereof; and
means for concatenating said outputs of said inverter and said expanding means to form said n-bit substitute values.

* * * * *